Figure 10:
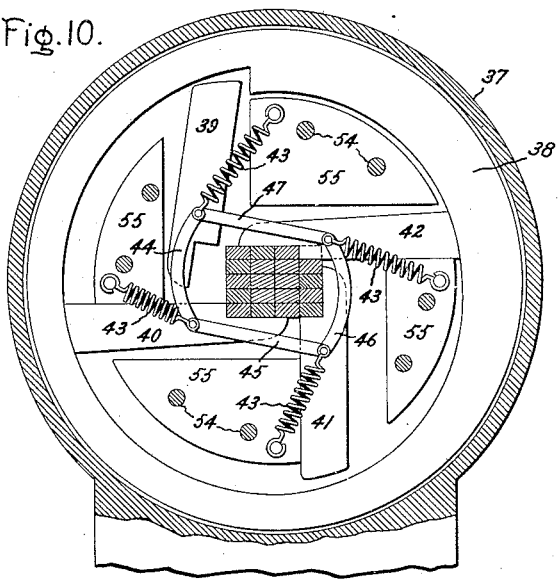

July 15, 1941.   A. U. WELCH, JR., ET AL   2,249,509
RECTANGULAR CABLE AND METHOD OF MAKING THE SAME
Filed Aug. 31, 1939   3 Sheets-Sheet 1
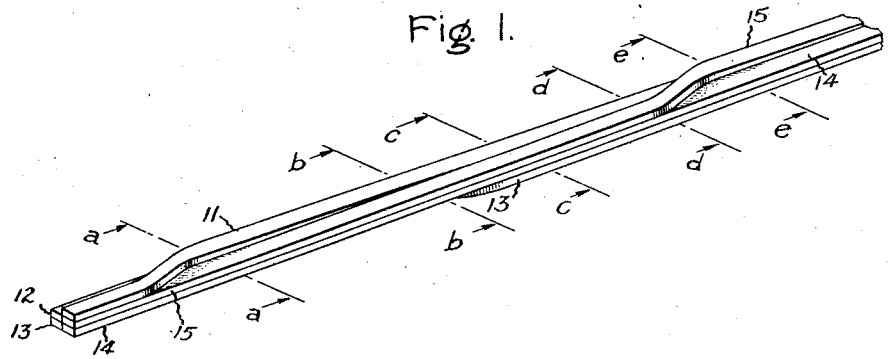
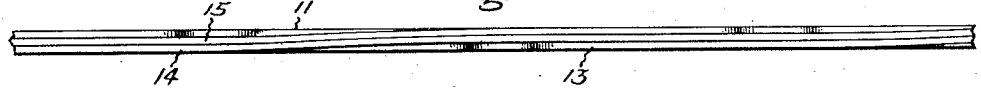
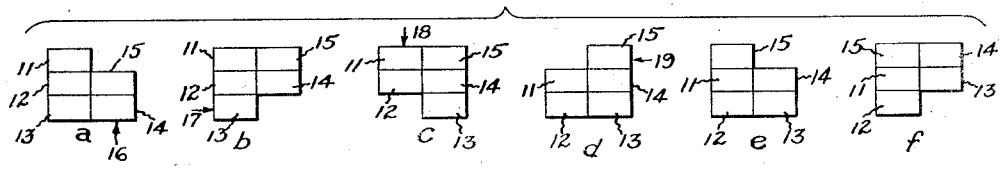
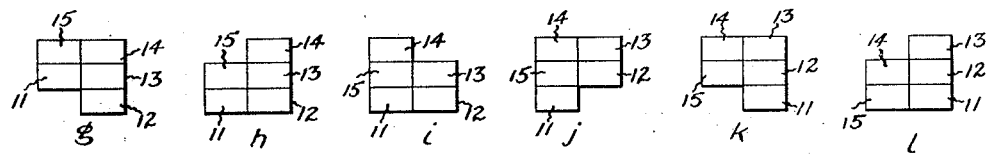
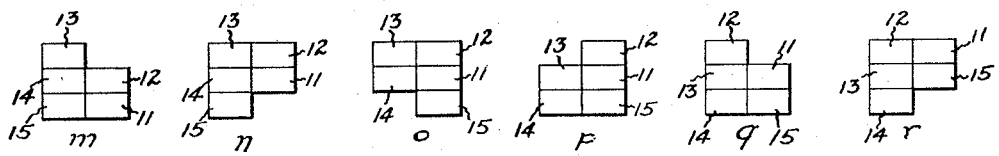
Inventors:
Alanson U. Welch, Jr.,
Curtiss M. Cederstrom,
by Harry E. Dunham
Their Attorney.

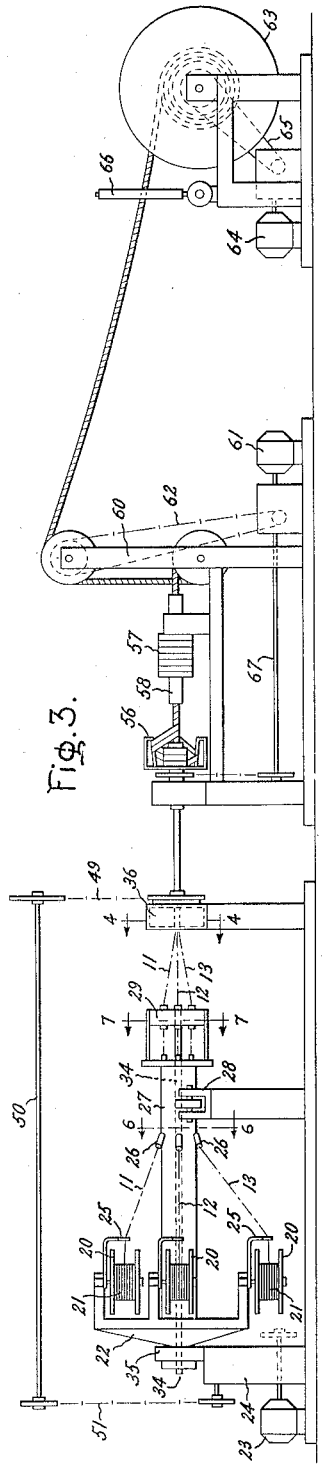
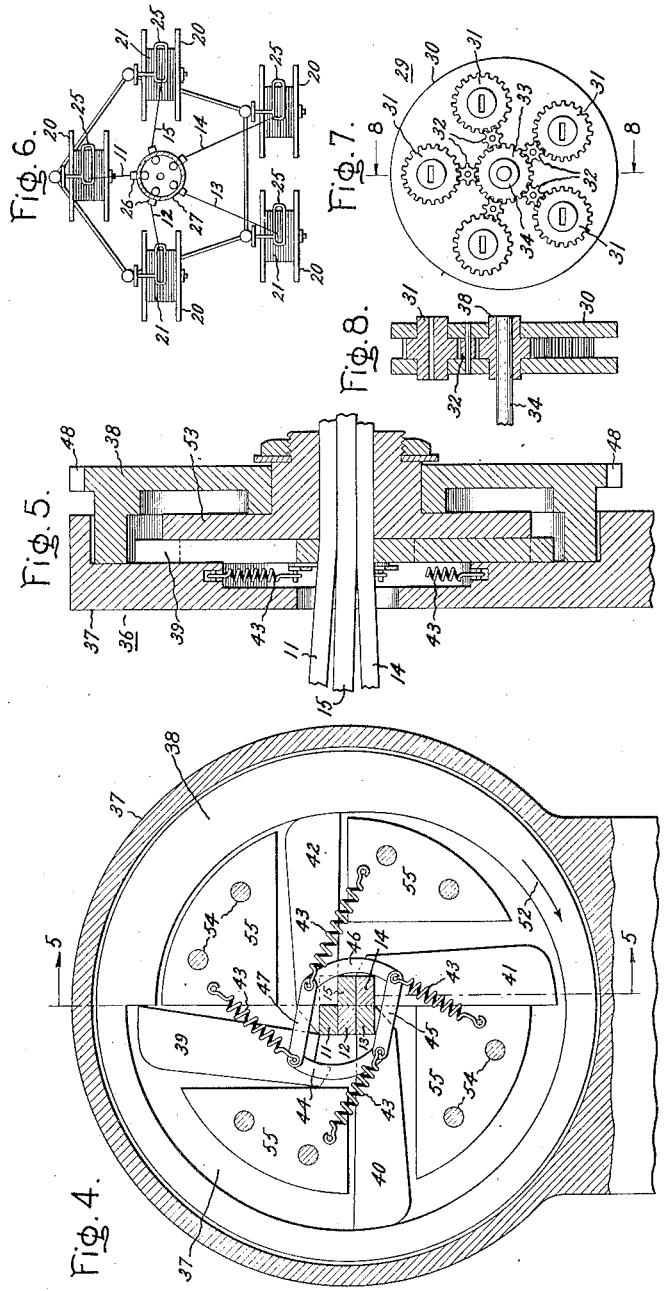
Inventors:
Alanson U. Welch, Jr.,
Curtiss M. Cederstrom,
by Harry E. Dunham
Their Attorney.

July 15, 1941.   A. U. WELCH, JR., ET AL   2,249,509
RECTANGULAR CABLE AND METHOD OF MAKING THE SAME
Filed Aug. 31, 1939   3 Sheets—Sheet 3

Inventors:
Alanson U. Welch, Jr.,
Curtiss M. Cederstrom,
by Harry E. Dunham
Their Attorney.

Patented July 15, 1941

2,249,509

UNITED STATES PATENT OFFICE 2,249,509

RECTANGULAR CABLE AND METHOD OF MAKING THE SAME

Alanson U. Welch, Jr., and Curtiss M. Cederstrom, Pittsfield, Mass., assignors to General Electric Company, a corporation of New York Application August 31, 1939, Serial No. 292,904

13 Claims. (Cl. 174—34)

Our invention relates to improvements in electric cables suitable for winding electrical apparatus coils, and to the method of making such cables.

In the use of conductors for relatively large currents, one or both of two difficulties are generally encountered, namely, excessive difficulty in bending them into a desired shape and excessive eddy current losses when carrying alternating current.

The difficulty of excessive rigidity is effectively overcome in conventional cables by stranding them; while the difficulty of excessive eddy current losses is overcome to a great degree by insulating the strands and twisting them in a manner to transpose them. But these cables are generally unsuitable for electrical apparatus windings, because, for one reason, round wires being used for the strands, voids exist between the strands of the cable, resulting in a conductor having poor space factor. It has been proposed to overcome this difficulty by subjecting the cable to a squeezing operation so as to make the metal of the strands flow into the voids. This obviously is impracticable with insulated strands, as it is likely to damage their insulation. Furthermore, conventional cables are circular in cross section; and therefore, winding them into a transformer coil, or inserting them into a rectangular armature slot, results in very poor space factor. To overcome this disadvantage, it has been proposed to press circular cables into rectangular shape, but obviously this also is impracticable with insulated strands unless the insulation is merely an oxide layer on the strands and inter-strand voltages are extremely low. A still further reason why conventional cables are unsuitable for electrical apparatus coils is that the former are flexible in every direction equally, while it is generally required that the conductor be highly flexible in one direction for ease of winding and highly rigid in a direction perpendicular to the aforementioned direction and parallel to the axis of the conductor so as to be able to withstand the electromagnetic or rotational bending forces acting on the conductor in a greater degree in the latter direction.

It is therefore the general object of the present invention to produce a cable which will be more suitable for apparatus windings. More specifically, one principal object of the invention is to produce a cable of generally rectangular cross section, made up of rectangular strands, and characterized with very low eddy current losses, great flexibility in its width or thickness and great rigidity in the alternate dimension.

Prior to the present invention, the conductors of high current apparatus have been formed generally with rectangular insulated strands wound in place or on forms into the final form of the winding; and it has been customary to transpose these strands in some fashion during the winding operation so as to balance out the differential voltages which tend to set up eddy currents among the strands. Various methods of making such transpositions have been practiced, each involving certain disadvantages and limitations. For instance, one typical method of making such transpositions, rather extensively used, is that described in United States Letters Patent No. 1,629,462, K. K. Palueff, issued May 17, 1927, and assigned to the assignee of the present invention. While that method is capable of very material reduction in the eddy current losses of a winding, it is not well adapted for making cables for general apparatus use, because the transpositions of that method have to be tailor-made on each winding at suitably spaced points determined by the length of the winding, distribution of its leakage field, etc.; and even then, the method is applicable to only a limited reduction of eddy current losses; and the twisting and other operations which the method involves results in the conductor bulging at each point of transposition.

It is therefore an object of the present invention to produce a cable of generally rectangular cross section which shall have smooth untwisted sides, which shall be of constant width and thickness along the cable and which may be wound uniformly and with high space factor into a coil of any size or shape with very low eddy current losses.

Another typical method of winding high current coils with a plurality of rectangular strands with transpositions, a method which is more nearly related to the present invention, is that illustrated by United States Letters Patent No. 1,144,252, L. Roebel, issued June 22, 1915. The method of transposition of strands there described has been applicable only to short lengths of strands and it has been customary as suggested in that patent to solder several such pieces of conductors together to form even a single turn of an armature winding. Aside from the inconvenience of soldering short pieces of these conductors, the windings suffer from high eddy current losses in all of the untransposed portions of the conductor; for one cycle of transpositions of the strands of the conductor is not capable of balancing out the differential voltages of the strands for the whole turn, or half of a turn, or even a smaller fraction of a turn longer than the transposed portion of the conductor. To be fully effective, the transpositions of the strands must be continuous throughout the entire length of the conductor of the coil. This has been recognized in the art in recent years but it has been impossible to perform the transpositions continuously on account of the entanglement of the unwound portions of the strands or for other reasons arising from the complications of having to wind a specialized coil and simultaneously having to transpose the strands of the conductor. To overcome some of these difficulties, two expedients have been resorted to, namely, first, the transpositions have been made at considerable distances from each other and, second, the strands have been transposed, first clockwise for some distance, then counterclockwise for an equal distance, so as to disentangle the unwound portions of the strands. This has resulted, in certain instances, in at least a partial loss of the benefit of one portion of transpositions by the succeeding reverse transpositions. Furthermore, even this compromise method has been feasible only with few strands; the conductor has still been somewhat lumpy at recurrent intervals; and in transformer windings, the strands have had to be insulated for the full required turn insulation, resulting in materially reduced space factor and increased cost of insulation.

Therefore, another object of the present invention is the production of a generally rectangular cable and an improved method for forming it in which the eddy current losses are low throughout the entire length of the cable, the strand insulation has a low value, the turn or cable insulation has a high value, and the cable is of unvarying or constant width and thickness along its entire length.

Figure 9:
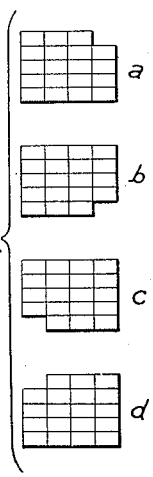
Figure 12:
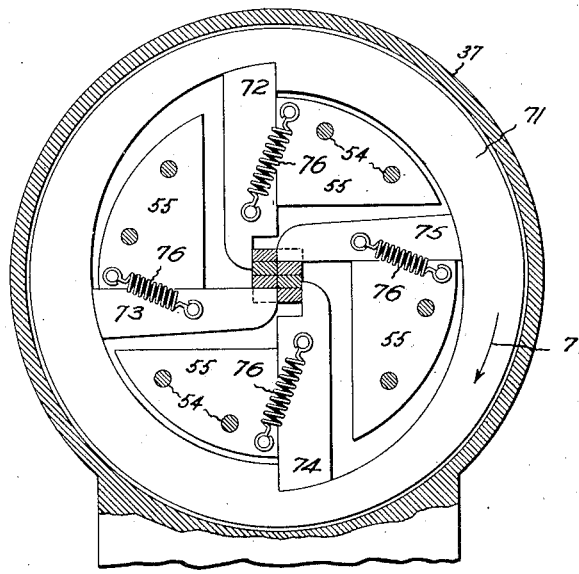
Figure 11:
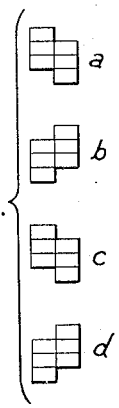

The invention will be better understood from the following description taken in connection with the accompanying drawings in which Figs. 1 and 2 show, by way of illustration, the structure of a piece of cable of relatively few strands made according to this invention, Fig. 1 showing the cable in perspective, and Fig. 2 showing diagrammatically the relationship between successive cross sections 2a to 2u inclusive of the cable; Fig. 3 illustrates the method of making a cable according to the present invention by a mechanism shown in side elevation and partially diagrammatically; Fig. 4 is a sectional view on the line 4—4 of Fig. 3; Fig. 5 is a sectional view on the line 5—5 of Fig. 4; Fig. 6 is a sectional view on the line 6—6 of Fig. 3; Fig. 7 is a sectional view on the line 7—7 of Fig. 3; Fig. 8 is a sectional view on the line 8—8 of Fig. 7; Fig 9 is a diagrammatic sectional view of a modified form of cable made in accordance with the invention; Fig. 10 is a sectional view of a transposing mechanism for transposing the strands of the form of cable shown in Fig. 9; Fig. 11 is a diagrammatic sectional view of another modified form of cable made in accordance with the invention; Fig. 12 is a sectional view of a transposing mechanism for transposing the strands of the form of cable shown in Fig. 11; and Fig. 13 is a side view of the piece of cable shown in Fig. 1.

Similar reference characters indicate like parts in all of the figures of the drawings.

The cable 10 shown in Fig. 1 of the drawings is formed of five insulated strands 11, 12, 13, 14 and 15 arranged in substantially parallel planes and in such manner as to constitute a generally rectangular conductor with a constant width of two strands and a constant thickness of three strands. The strands are transposed without being twisted. The transposition of the strands without twisting is accomplished by progressive bending and reverse bending of the strands alternately along their width and along their thickness. When a strand is bent edgewise, the orientation of its plane is not affected at all of course. When bent flatwise, its plane is slightly changed in a mathematical sense but, as will be obvious from the drawing, such bending is slight and occurs in only a small portion of the strand so that the plane of the strand quickly returns to its earlier orientation by the reverse bending of the strand. In other words, the orientation of the plane of each strand is generally constant but undulates slightly when considered at certain short intervals.

The arrangement of the strands in the cable may be clearly understood by reference to Fig. 2 which shows a series of successive cross-sections a to u inclusive of the cable shown in Fig. 1. Starting with the arrangement of the strands shown in section 2a, the strands 14 and 15 are bent progressively upward until the arrangement shown in section 2b is reached. The arrow 16 indicates the direction of the force which brought about the change from the preceding section 2a. The strand 13 is now bent edgewise by a force acting in the direction indicated by the arrow 17 until the arrangement shown in section 2c is reached. The strands 11 and 12 are now bent downwardly together until the arrangement shown in section 2d is reached, the direction of the bending force being indicated by the arrow 18. The strand 15 is next bent edgewise until the arrangement shown in section 2e is reached, the direction of the bending force being indicated by the arrow 19. The successive bending of the strands is continued at spaced intervals indefinitely through the various stages indicated in successive sections and throughout many cycles for the entire length of the cable. It will be seen that the arrangement of the strands in the section 2u is identical with that in section 2a and that between these two sections every strand in succession occupies every position in the cable and for an equal distance along the cable. In other words, between the sections 2a and 2u the strands have undergone one complete cycle of transposition. This equalizes the flux linkages of all of the strands in this length of the cable and balances out differences in strand voltages which would otherwise tend to set up circulating currents among the strands. The best results are obtained when the alternating magnetic field in which the cable may be located is substantially constant for at least a distance equal to the length of the cable corresponding to one complete cycle of transposition, but great benefit is secured even when this condition is not perfectly fulfilled. In general, the magnetic field does not have to be uniform in the plane of the cross section of the cable and the field distribution may be different along different cycles of transposition without impairing the effect of the transpositions. If the cable is used as a straight conductor, the length of the cable along which a cycle of transposition is completed is relatively unimportant, provided that that length does not greatly exceed the length of the cable to be used. But in the use of the cable in electrical apparatus windings, differential voltages in the strands at any point of the cable are produced not only by the currents in that part of the cable but also by those in other parts of the winding and therefore it is desirable that these progressive transpositions be completed in as short lengths of the cable as practicable without resorting to such sharp bending of the strands as would harm any insulation on the individual strands.

It will be obvious from a consideration of Figs. 2 and 13 that the width of the cable is constant and is everywhere exactly equal to the width of a row of two strands and that the thickness of the cable is also constant and everywhere exactly equal to the thickness of a column of three strands. The constancy of thickness is assured by the use of an odd number of strands in the cable. If an even number of strands were used, say six strands instead of five, the progressive transpositions of the strands would make them occupy successive positions like those illustrated in Fig. 11, which will be described later, but from which it is clear that the thickness of the cable would fluctuate at frequent intervals between the thickness of three strands and the thickness of four strands. This may be undesirable in an electrical apparatus winding if the strand thickness is an appreciable fraction of the thickness of the cable and therefore the cable with the odd number of strands and a constant thickness may be preferred, but when the strand thickness is small or a non-uniform thickness of the cable is not objectionable, a cable with an even number of strands may be used. If the individual strands are very thin so that the thickness of a cable having an even number of strands is not far from constant, the thin strands tend to buckle when they are bent edgewise so that the preferable method of securing a constant thickness of the cable is the use of an odd number of strands. The absence of a single strand in the cable having an odd number of strands not only does not result in a poorer space factor but actually improves the space factor as compared with a cable having bulging portions resulting from the use of an even number of strands. While in neither case is the cross section of the cable a perfect and complete rectangle all along the cable, yet the cable having an odd number of strands, by virtue of its constant width and thickness and the smoothness of its sides, is generally rectangular and fits perfectly for all practical purposes into a rectangular slot of an armature or into a rectangular winding space of a transformer winding.

It will be seen that a cable such as is shown in Fig. 1 will have great rigidity in the direction of the width of the strands, the rigidity depending on their width, and great flexibility in the direction of the thickness of the strands, this flexibility depending on their thinness. As the planes of the strands are never twisted, the directions of rigidity and flexibility of the cable are unchanged all along the cable.

Cables such as have been described are particularly valuable for winding solenoidal coils in which the width of each strand is parallel to the axis of the solenoid so that in forming the coil the cable is bent in the direction in which it is most flexible and the strands are orientated with their widths parallel to the general direction of the flux permeating them. This latter condition is essential for reducing the eddy currents within each strand because, although transposition of the strands reduces the eddy currents between the strands, it does not reduce eddy currents within the individual strands. Eddy currents within the individual strands are reduced by orientating the strands so as to make their wider dimensions parallel to the flux flowing through them. As the flux in a solenoid is predominantly axial, the benefit of the parallelism of the strand width to the axis of the solenoid throughout the coil will be appreciated. As a result it will be seen why the present invention aims at keeping the planes of the strands untwisted and substantially parallel throughout the length of the cable and it will also be seen that considerable undulation of the planes of the strands arising from their flatwise bending is permissible as this does not tend to turn the width of the strand away from parallelism with the width of the cable and the axis of the solenoid.

A cable-making machine for forming cables in accordance with the present invention is illustrated in Fig. 3 of the drawings. This machine is disclosed and claimed in our application Serial Number 292,905, which has matured into Patent No. 2,234,996, dated March 18, 1941, filed concurrently herewith, but it is shown and described here in order to show how cables embodying our invention can be made by carrying out the process of our invention automatically. The machine is shown as arranged for forming a cable of five strands and includes five reels 20, each reel holding a roll of rectangular insulated wire 21 to be made into the desired cable. Fig. 6 shows these reels more clearly. The reels 20 are pivotally suspended from projecting arms of a support 22 which may be rotated about its axis by a motor 23 through a suitable reduction gear mechanism in a gear box 24. In this particular embodiment of the invention, the reels 20 are suspended with their axes arranged vertically and each reel is rotatable about its own axis. The reels 20 are suspended from horizontal axes parallel to the axis of rotation of the support 22 with the centers of gravity of the reels below their pivotal supports so that, as the support 22 is rotated and the rolls of wire 21 on the reels 20 are carried around with it, the axes of the reels 20 and rolls of wire 21 are maintained always in vertical directions and their planes in horizontal positions. The strands 11 to 15 inclusive are unreeled and withdrawn from the reels 20, passed through guides 25 and led through bushings 26 into a tube 27. This tube 27 is secured at one end to the rotatable support 22 and is supported by a bearing 28. The other end of the tube 27 is secured to a planetary gear mechanism 29 which functions to maintain the planes of the individual strands parallel to each other and unchanging and to prevent their twisting as the strands of wire revolve in unison with the tube 27, the bushings 26 and the reels 20. A sectional view of the planetary gear mechanism 29 is shown in Fig. 7. This planetary gear mechanism includes a vertical plate 30 which forms part of the housing for the planetary gears. Five gears 31 distributed about the axis of the plate 30 are pivotally supported in openings in this plate, as indicated in the sectional view shown in Fig. 8. Five intermediate gears 32 distributed also about the axis of the plate 30 are arranged in mesh respectively withe the five gears 31 and are also pivotally mounted in openings in the plate 30. A central gear 33 is also pivotally mounted in an opening in the plate 30 and is secured to a rod 34 which extends back along the axis of the tube 27 and is secured to the fixed support 35 carrying the reel support 22 so that this rod 34 and the central gear 33 of the planetary gear mechanism are fixed and cannot rotate. Each of the outer gears 31 is formed with an axial opening for one of the strands from the reels 20 to pass through. The openings in the gears 31 are similar in cross-section to that of the strands and just large enough to permit the strands to pass through without excessive friction while functioning at the same time to guide the strands and maintain their planes constantly parallel to each other and to a fixed plane. Each pivotally supported gear 31 is geared to the stationary central gear 33 by one of the rotatable intermediate gears 32. It will be seen that as the plate 30 is rotated by the tube 27 and in unison with the reels 20, the gears 31 and 32 will be carried around the stationary gear 33 in the same direction. If these gears 31 and 32 were not geared to the stationary gear 33, their motions around the stationary gear 33 would result in an equal rotation around their own axes. However, as they are geared to the stationary gear 33, the intermediate gears 32 are forced to rotate in the same direction as that of the plate 30 so that these intermediate gears 32 will tend to rotate the outer gears 31 in a direction opposite to that of the plate 30. If the stationary gear 33 and the outer gears 31 have the same number of teeth, it will be seen that the outer gears 31 are prevented from any rotation about their own axes. The openings in the gears 31 thus maintain the planes of the strands passing through them constantly parallel to each other and to a fixed plane as the strands are carried around the axis of the machine. As shown in the drawings, the planes of the strands are maintained always in horizontal positions.

Leaving the planetary gear mechanism in proper orientation, the strands 11 to 15 inclusive are brought together into a transposing mechanism 36 shown in the sectional views in Figs. 4 and 5. This transposing mechanism includes a stationary housing 37, a rotatable internal cam 38 and four floating fingers 39, 40, 41 and 42, the function of these fingers being to transpose the strands as they are brought together to form the cable. The positions and movements of the transposing fingers 39 to 42 inclusive are controlled by the internal cam 38, springs 43 and links 44, 45, 46 and 47 which are pivotally connected between the fingers as shown. The outer perimeter of the internal cam 38 is circular and is provided with sprocket teeth 48 to permit it to be driven by a chain drive 49 from the shaft 50 which is driven by a chain 51 and the gear mechanism in the gear box 24. The inner cam surface of the cam 38 is formed so that one-half of it, shown at the left in Fig. 4, is concentric with the axis of the cam, the next quadrant in the direction of the arrow 52 gradually approaches the axis of the cam and the remaining quadrant is again concentric with the axis of the cam. A fixed plate 53 is secured by pins 54 to raised portions 55 of the housing 37 and has a central rectangular opening corresponding to the dimensions of the cable. This plate 53 is positioned close beside the transposing fingers 39 to 42 inclusive and its rectangular central opening guides the cable and confines its strands within the contour of the cable as they are being transposed so that orientation and sequence of the strands are maintained. With the positions of the fingers 39 to 42 inclusive, as shown in Fig. 4, where the strands of the cable are arranged as shown in Fig. 2a, the finger 40 is held in position against the strand 13 by the link 44 and the two springs 43 connected to this link and also by the link 45 connected between the fingers 40 and 41. This finger 40 will remain in this position for another quarter rotation of the cam 38 which rotates in the direction of the arrow 52. The finger 39 has just been released by the cam 38 to permit this finger 39 to be pulled upwardly by its spring 43 and a notch at its lower end to engage the strand 11 when pulled back over that strand by the link 47. The finger 39 will remain in its new position for a half a rotation of the cam 38. The finger 42 is now being pressed against the strand 11 by the cam 38 and will remain in this position for another quarter rotation of the cam. The finger 41 is being held up to engage the strand 14 in its notch by the link 46 which is connected between the fingers 41 and 42. After a small further rotation of the cam 38 in the direction of the arrow 52, the cam will engage the lower end of the finger 41 and begin to force this finger upwardly to bend the strands 14 and 15 so that the strand 14 will then reach the space previously occupied by the strand 15. The strands will then occupy the positions shown in Fig. 2b. The rising portion of the cam 38 will now have approached the finger 40 and during its next quarter rotation will push this finger to bend the strand 13 to the right, the strands then occupying the positions shown in Fig. 2c. In the next quarter rotation of the cam 38, the cam will push the finger 39 downwardly and this will bend the strands 11 and 12 to bring the strands into the positions shown in Fig. 2d. Another quarter rotation of the cam 38 will finish one complete rotation thereof and will push the finger 42 to the left, bending the strand 15 to the left and leaving the strands in the positions shown in Fig. 2e. This sequence of operations will be repeated indefinitely, making cycle after cycle of transportations of the strands along the cable. While the transposing mechanism is operating, the strands are pulled through it and through the differential gear mechanism 29 from the reels 20 so that successive transpositions of the strands take place at successive intervals along the strands and the cable and the strands leave the transposing mechanism in the form of the cable shown in Fig. 1. The sprocket teeth 48 along the outer edge of the cam member 38 are driven by the motor 23 through the sprocket chain 51, the shaft 50 and the sprocket chain 49. The rotation of the reels 20 and their rolls of wire 21 and the rotation of the cam 38 of the transposing mechanism 36 are thus mechanically coupled. The proper ratio between the rates of rotation of the cam 38 and the revolving reel support 22 which this coupling must maintain is determined by the consideration that one complete rotation of the cam 38 changes the position of the strands from that shown in Fig. 2a to that shown in Fig. 2d, a change representing a rotation of the positions of the strands by the distance between two adjacent strands. As a complete cycle of transpositions of the strands requires a complete rotation of the positions of the strands, in the present case five strands, the mechanical coupling between the cam 38 and the reel support 22 must be such as to cause five revolutions of the cam 38 to one revolution of the reel support 22. It will be evident that in cables formed of an odd number of strands and having a width of two strands this ratio will be the same as the number of the strands. After leaving the transposing mechanism 36 the cable is passed through a conventional insulation covering machine 56 which wraps cotton, paper or other insulating strips around the cable. An extra supply of rolls of insulating tape or ribbon 57 may be provided on a tubular support 58 surrounding the cable so that when the rolls 59 are used up they may be replaced without cutting the cable. The insulated cable is now passed from the insulating mechanism 56 through a winch mechanism 60 which is driven by a motor 61 and a sprocket chain 62 to pull the cable through the preceding mechanisms and feed it onto a reel 63 which is driven by a motor 64 and a sprocket chain 65. The reeling machine may include a conventional reciprocating guide 66 for guiding the cable onto the reel 63. The winch mechanism 60 and the reeling mechanism for driving the reel 63 may be of any conventional types and none of the features of these mechanisms constitute part of the present invention.

It will be seen that mechanical coupling is provided between the insulation wrapping mechanism 56 and the winch mechanism 60 through a shaft 67 which is driven by the same motor 61 that drives the winch mechanism 60. Such coupling is desirable to secure uniform application of insulation to the cable.

In the parts of the machine so far described no mechanical coupling is provided between the transposing mechanism 36 and the winch mechanism 60 because the length of cable along which each complete cycle of transposition is effected need not be precisely the same for each cycle of transposition and therefore the ratio of the motions of the transposing mechanism 36 and the winch mechanism 60 need not be precisely maintained. It is obvious, however, that any suitable coupling may be provided between such mechanisms if so desired.

Stranded cables are frequently made by adding layer after layer of strands to a central longitudinal core. The principle of the present invention may also be applied in the production of that type of cable. Fig. 9 shows sectional views 9a, 9b, 9c and 9d taken at equal, short intervals along such a cored cable. The central rectangle in these sections is the core of the cable and is shown here as having the width of two strands and the thickness of three strands. The strands of the outer layer of this cored cable are arranged lengthwise of the core with their planes substantially parallel and they form a layer around the core to provide an enlarged substantially rectangular conductor. One strand is omitted from this outer stranded layer to make room for transpositions without overbuilding the width or thickness of the cable at recurrent intervals. The strands are transposed by rotating them around the core in a manner exactly similar to that already described in connection with the machine shown in Fig. 3. The same machine may be used except that the number of reels 20 should correspond to the number of strands. The transposing mechanism is shown in Fig. 10 and is exactly like that shown in Fig. 4 except that the proportions are changed because of the greater width and thickness of the cable. Comparison of the sectional views of the cable shown in Fig. 9 will show that the positions of the strands have been rotated by the dimensions of one strand at each transposition point and that if this operation is carried on until the number of transpositions equals the number of strands, then the strands will have undergone one complete cycle of transposition. The cycles of transposition are repeated indefinitely for the entire length of the cable. Additional layers may be placed on the cable in the same way to build up still larger cables in the same manner. A central core of the cable may be formed of transposed strands, as shown in Fig. 10, but it may obviously be in the form of a single solid conductor if desired.

Successive sections of a stranded cable formed from an even number of conductors are shown in Fig. 11. It will be obvious that the width of this cable is constant but that the thickness undulates between that of three conductors and that of four conductors. The same machine which has been described and which has been shown in Fig. 3 may be used to transpose the strands of this cable except that the transposing mechanism is somewhat different as shown in Fig. 12. In this transposing mechanism the internal cam 71 is a double cam, both halves of the cam being similar. With the positions of the cam 71 and the fingers 72, 73, 74 and 75 as shown in Fig. 12, the cam has just pushed the fingers 73 and 75 inwardly to bend the upper and lower strands of the cable into the positions shown in the figure. The fingers 72 and 74 have been released by the cam and pulled back from the cable by their springs 76. A quarter rotation of the cam 71 in the direction of the arrow 77 will first push the fingers 72 and 74 to bend the left and right columns of strands in opposite directions until they are in the relative positions shown in Fig. 11b. Just at the completion of this motion of the cam, the fingers 73 and 75 will be released and retracted by their springs 76 into positions ready to engage the upper and lower single strands as shown in the section of Fig. 11b. These upper and lower single strands will be held in this position by the fingers 73 and 75 during the succeeding revolution of the cam 71 while the cam is forcing the fingers 72 and 74 again towards the cable to bend the left and right columns of strands into the position shown in Fig. 11d. This sequence of operations is repeated indefinitely throughout the length of the cable.

In each of the forms of cable which have been described the transposing of the strands throughout many cycles produces a cable having a plurality of superposed rows of strands arranged in a plurality of columns, the transpositions causing the strands to change their positions progressively around the axis of the cable but at the same time maintaining the same sequence and without twisting the individual strands.

The invention has been explained by describing and illustrating a particular form of transposed, stranded cable and certain modifications thereof and a method for forming them, but it will be apparent that other changes may be made without departing from the spirit of the invention and the scope of the appended claims.

What we claim as new and desire to secure by Letters Patent of the United States, is:

1. Electric cable comprising a plurality of insulated rectangular strands of untwisted wire arranged in a plurality of superposed rows forming a conductor of substantially constant width and thickness, and the strands thereof being progressively transposed in many cycles at spaced intervals longitudinally of a cable.

2. Electric cable including a plurality of insulated rectangular strands of untwisted wire forming a conductor of substantially constant width and thickness a plurality of strands wide and a plurality of strands thick, said strands being transposed progressively throughout many cycles and in the same direction about their common axis.

3. Electric cable of constant width and thickness comprising rectangular strands of wire arranged at frequent intervals in a plurality of superposed rows, at least one of said rows consisting of one less strand than in the other rows, said strands being transposed at spaced intervals along the cable by a progressive rotation of their positions while maintaining the same sequence about the axis of the cable.

4. Electric cable of constant width and thickness comprising an odd number of rectangular strands of wire arranged at frequent intervals in a plurality of superposed rows, each row except one consisting of two strands and said one row consisting of one strand at frequent intervals, said strands being transposed by a progressive rotation of their positions while maintaining the same sequence about the axis of the cable.

5. An electric cable comprising a plurality of insulated strands of rectangular untwisted wire arranged in a plurality of superposed rows, said strands being of substantially equal and uniform cross-section, and being transposed progressively about the axis of said cable, the cross-section dimensions of said cable varying by less than the corresponding dimensions of one of said strands.

6. An electric cable comprising a plurality of rectangular strands arranged together in a plurality of superposed rows, all of said rows except the end rows having the same number of strands each, said end rows at alternate intervals consisting of one less strand than the remaining rows, said strands being transposed by a progressive rotation of their positions while maintaining the same sequence about the axis of the cable.

7. Electric cable comprising a longitudinal core of rectangular cross-section, and an odd number of insulated rectangular strands of untwisted wire extending predominantly lengthwise of said core and arranged in substantially parallel planes in a layer adjacent and surrounding said core to form a conductor of a substantially constant width and thickness, said strands having progressive bends alternately along their width and thickness, and the positions of said strands following a helical path around said core and maintaining the same sequence.

8. Electric cable comprising a longitudinal core of generally rectangular cross-section and a plurality of insulated rectangular strands of untwisted wire extending predominantly lengthwise of said core and arranged in substantially parallel planes in a layer adjacent and surrounding said core to form a conductor of a generally rectangular cross-section less one strand, said strands being bent progressively in the directions of their width and thickness alternately at spaced intervals along the cable to cause the positions of said strands to revolve progressively around said core while maintaining the same sequence.

9. The method of making an electric cable from a plurality of insulated rectangular strands of wire, bringing said strands together with their planes maintained substantially parallel to a fixed plane to form a conductor having a plurality of strands in its width and a plurality of strands in its thickness, bending said strands alternately in the directions of their width and thickness at spaced intervals progressively about a common axis to cause the positions of said strands in the conductor to change progressively and in the same direction about their common axis, maintaining said strands in the same sequence, holding said strands together, and maintaining the orientation of the cross section of said conductor unchanged.

10. The method of making an electric cable of substantially constant width and thickness which comprises bringing a plurality of rectangular insulated strands of wire together in a plurality of superposed rows and juxtaposed columns with one less strand in one end row than in the remaining rows, bending said strands alternately at spaced intervals in the direction of their width and in the direction of their thickness rotationally along the axis of the cable.

11. The method of making an electric cable of substantially constant width and thickness which comprises bringing a plurality of rectangular insulated strands of wire together into a plurality of superposed rows and into at least two juxtaposed columns with one less strand in one outer column than in the remaining columns, bending progressively at spaced intervals in the same direction about the cable axis first the end row having the least number of strands in the direction of the column having the least number of strands an amount equal to the width of one strand, then bending the column opposite said last mentioned column by an amount equal to the thickness of one strand, then bending the other end row followed by bending said first column by correspondingly similar amounts, said bending operations being continued whereby each strand in the outer surface of said cable follows a helical path around the axis of said cable.

12. The method of making an electric cable from a plurality of insulated rectangular strands of wire, revolving said strands about a common axis in unison while maintaining the same orientations, bringing said strands together while maintaining their planes substantially parallel to a fixed plane in a plurality of rows and columns to form a conductor with each row occupying the width of two strands at recurrent intervals, alternately bending an end row and a column in the same direction at spaced intervals about the common axis of the strands to cause the positions of the strands to revolve progressively and synchronously in a plurality of cycles while maintaining the same sequence and holding said strands together while maintaining the orientation of the cross-section of the conductor unchanged.

13. The method of making an electric cable having a longitudinal central core of rectangular cross-section, said method comprising the operations of bringing an odd number of insulated rectangular strands of untwisted wire together in substantially parallel planes to form a layer around said core, progressively and alternately bending said strands in the directions of their width and thickness at spaced intervals along the cable to cause the positions of said strands to change progressively and in the same direction about their common axis.

ALANSON U. WELCH, JR.
CURTISS M. CEDERSTROM.